US007035952B2

(12) United States Patent
Elliott et al.

(10) Patent No.: US 7,035,952 B2
(45) Date of Patent: Apr. 25, 2006

(54) SYSTEM HAVING STORAGE SUBSYSTEMS AND A LINK COUPLING THE STORAGE SUBSYSTEMS

(75) Inventors: Robert C. Elliott, Houston, TX (US); Thomas Grieff, Cypress, TX (US); Joseph E. Foster, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 231 days.

(21) Appl. No.: 10/669,388

(22) Filed: Sep. 24, 2003

(65) Prior Publication Data

US 2005/0066100 A1 Mar. 24, 2005

(51) Int. Cl.
G06F 13/00 (2006.01)
(52) U.S. Cl. .................. 710/300; 711/114; 711/141; 370/363
(58) Field of Classification Search .............. 710/5, 710/36, 62, 63, 100, 300; 711/113, 114, 711/130, 118, 112, 148, 14; 714/5, 7, 9; 700/2; 370/363, 452
See application file for complete search history.

(56) References Cited

U.S. PATENT DOCUMENTS

| | | | |
|---|---|---|---|
| 4,791,629 A * | 12/1988 | Burns et al. .............. 370/363 |
| 5,504,926 A * | 4/1996 | Jackson .................... 710/5 |
| 5,530,845 A * | 6/1996 | Hiatt et al. ................ 703/27 |
| 5,630,169 A * | 5/1997 | Jackson .................... 710/5 |
| 5,790,775 A * | 8/1998 | Marks et al. .............. 714/9 |
| 6,381,674 B1 * | 4/2002 | DeKoning et al. ........ 711/113 |
| 6,901,531 B1 * | 5/2005 | Gilbert et al. ............. 714/5 |
| 2004/0193736 A1 * | 9/2004 | Galloway ................. 710/1 |
| 2005/0125574 A1 * | 6/2005 | Foster et al. ............. 710/36 |
| 2005/0154826 A1 * | 7/2005 | Marks et al. ............. 711/114 |

OTHER PUBLICATIONS

"Resource management in an integrated optical network" by Sohraby et al. (abstract only) Publication Date: Sep. 2003.*
Robert C. Elliot, Working Draft American National Standard, T10/1562-D, "Information Technology-Serial Attached SCSI (SAS)," pp. 1-432 Rev. 5 (Jul. 9, 2003).
Robert C. Elliot, Working Draft American National Standard, T10/1601-D, "Information Technology-Serial Attached SCSI-1.1 (SAS-1.1)," pp. 1-435 Rev. (Sep. 18, 2003).

* cited by examiner

Primary Examiner—Gopal C. Ray

(57) ABSTRACT

A system includes plural storage subsystems each having a controller and an expander to couple to storage devices. The controller accesses the storage devices through the expander, and the expander has interfaces for coupling to the storage devices. The system further includes an intercontroller link to connect expanders in two storage subsystems to enable the controller in one of the storage subsystems to communicate with the controller in another one of the storage subsystems through the expanders and the intercontroller link.

19 Claims, 8 Drawing Sheets

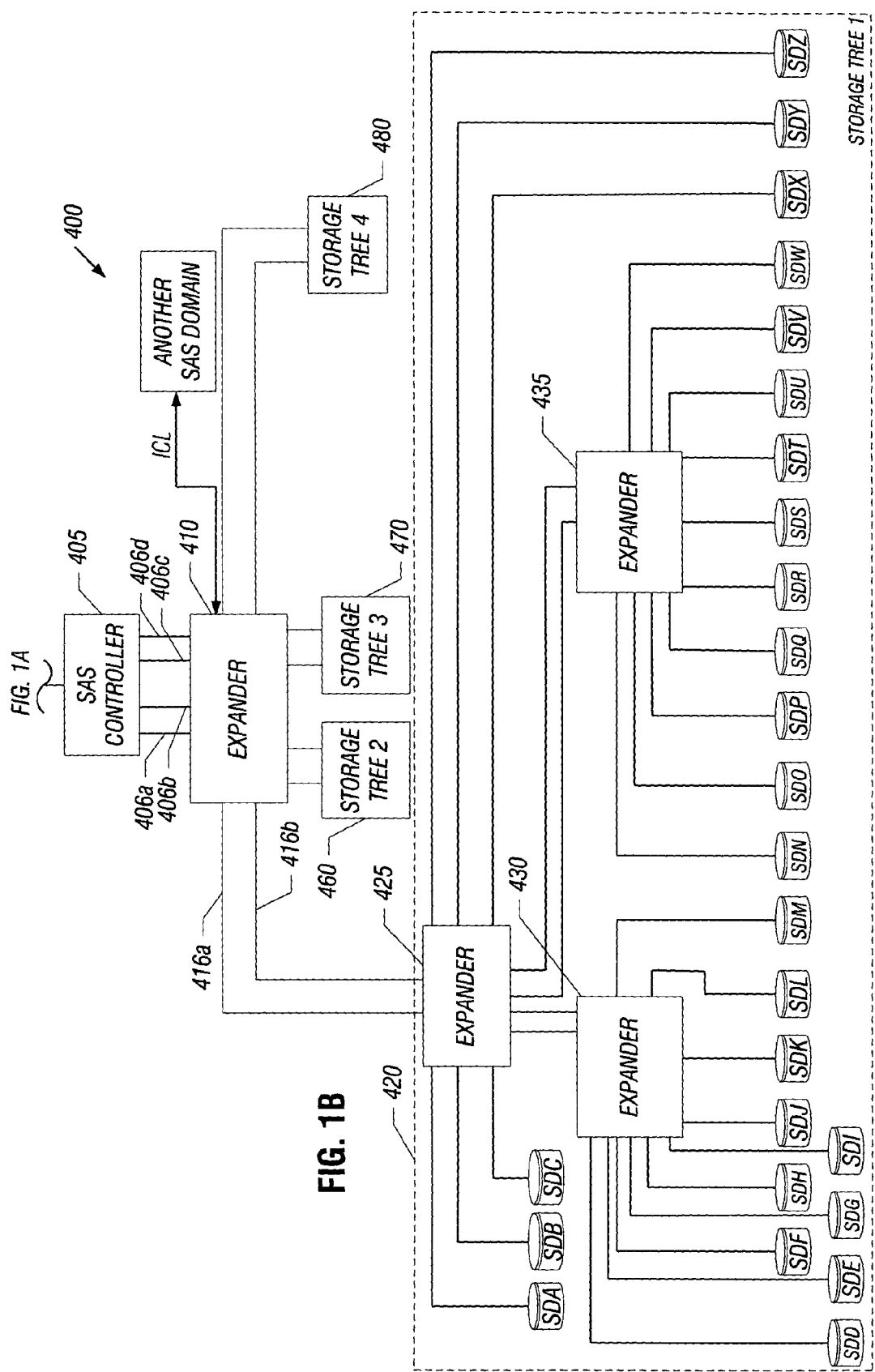

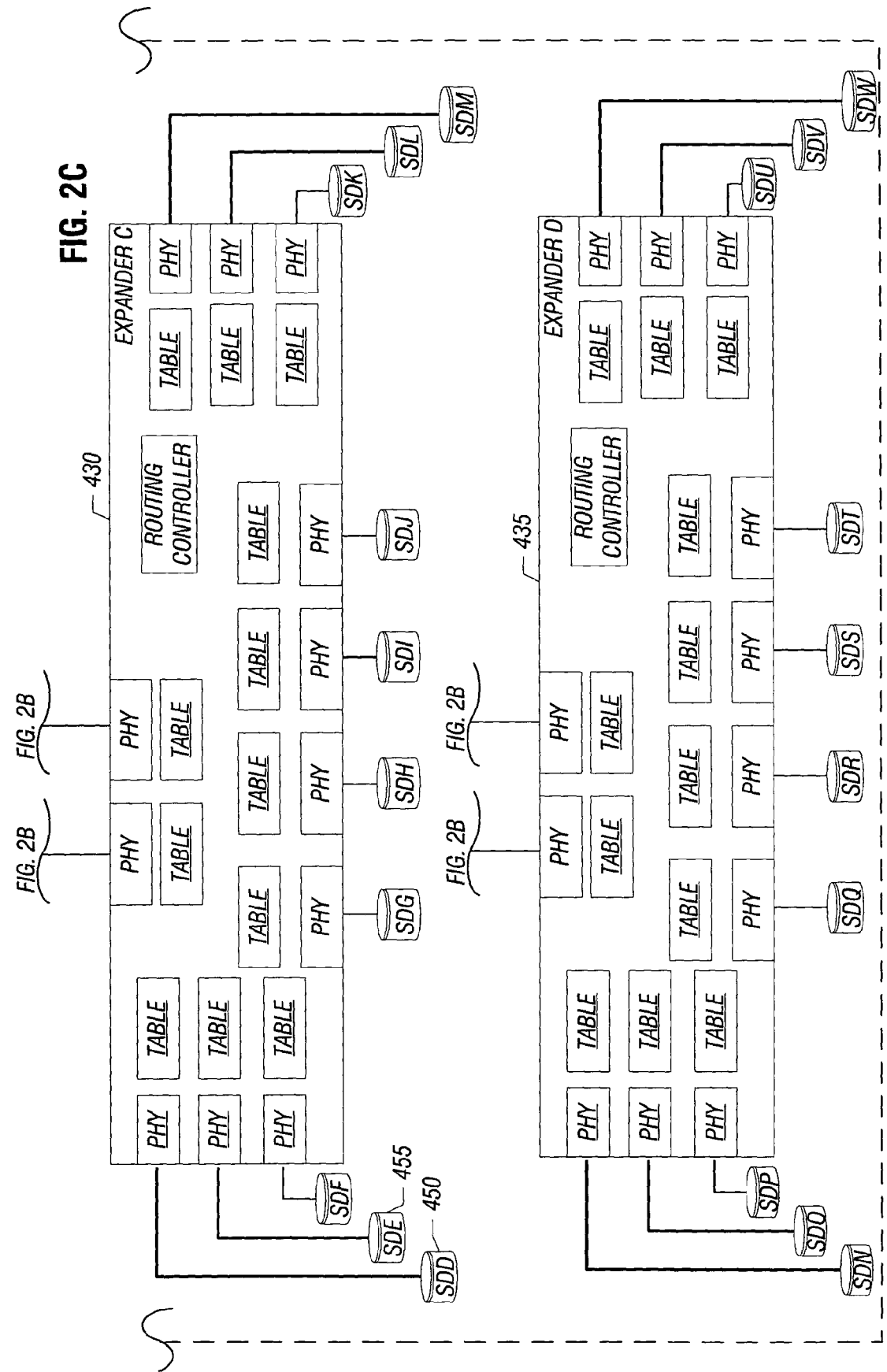

SYSTEM HAVING STORAGE SUBSYSTEMS AND A LINK COUPLING THE STORAGE SUBSYSTEMS

BACKGROUND

In certain applications, such as in a network environment, relatively large amounts of data may have to be stored in storage subsystems of computer systems. In a network environment, many users store data and programs on one or more computer servers, which usually include or are attached to one or more storage subsystems of relatively large capacity. A computer server storage subsystem can be made up of a large number of storage devices, including hard disk drives, tape drives, compact disc (CD) drives, digital versatile disc (DVD) drives, and so forth.

A popular interface for coupling storage devices (and other peripheral devices) to a computer system is the small computer system interface (SCSI). A SCSI interface is traditionally a parallel interface (having multiple signals) to provide increased bandwidth in communications between a computer and a peripheral device. However, parallel interfaces may not be able to offer reliable performance at very high operating frequencies.

To address issues associated with traditional SCSI interfaces, a Serial Attached SCSI (SAS) Standard has been proposed. The SAS Standard defines the rules for exchanging information between SCSI devices using a serial interconnect. The SAS Standard also defines the rules for exchanging information between AT attached (ATA) host and ATA devices using the same serial interconnect. ATA is a standard for the internal attachment of storage devices to hosts. One version of the SAS Standard is defined by Working Draft American National Standard, "Information Technology-Serial Attached SCSI (SAS)," Revision 5, dated Jul. 9, 2003.

One feature of a SAS system is that multiple SAS domains can be defined, with each domain having a tree of interconnected devices that include one or more expanders. An expander increases the number of interfaces available to couple to peripheral devices (such as storage devices) within a given SAS tree. Expanders can be coupled to other expanders to further expand the capacity to attach to additional peripheral devices. Usually, each SAS domain (or SAS expander tree) is associated with one or more initiators. An initiator responds to commands from software in a computer system for accessing storage devices in a domain to retrieve data or to write data.

According to the SAS Standard, for initiators in different SAS expander domains to communicate with each other (referred to as "inter-initiator communications"), interfaces (referred to as "phys") are dedicated within each initiator for such inter-initiator communications. Dedicating a phy for inter-initiator communications means that the phy is unavailable for coupling to other devices in a SAS expander domain, such as storage devices or expanders.

BRIEF DESCRIPTION OF THE DRAWINGS

FIGS. 1A–1B are a block diagram of an example computer system including Serial Attached Small Computer System Interface (SAS) storage devices.

FIGS. 2A–2C are a block diagram of components of expanders in a SAS storage tree in the computer system of FIG. 1.

DETAILED DESCRIPTION

Figure 1A:
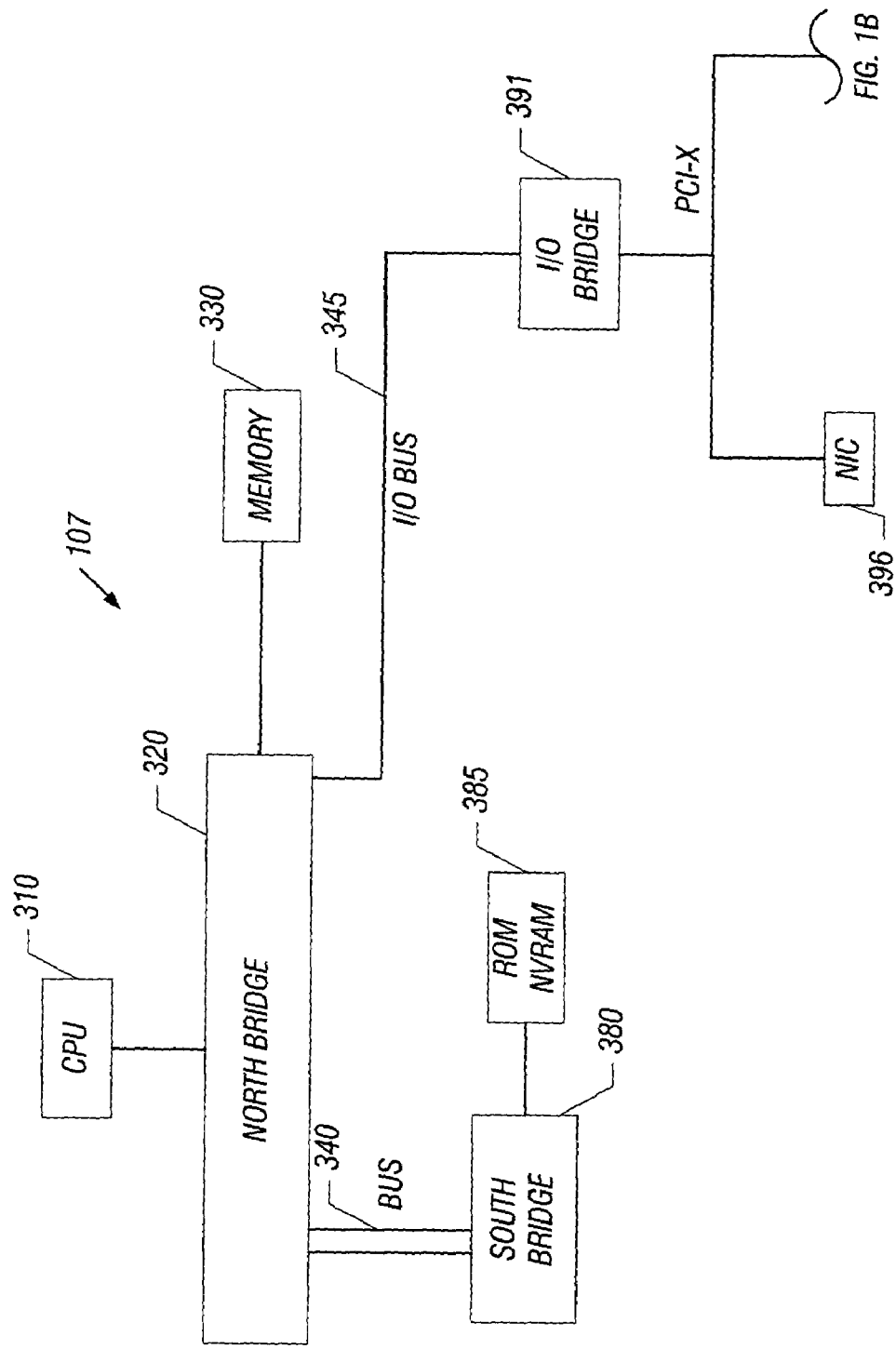

Referring now to FIGS. 1A–1B, a computer system 107 according to one example arrangement includes a central processing unit (CPU) 310, memory 330, and a bridge device such as north bridge 320. The north bridge 320 may be coupled through a bus 340 to another bridge device such as south bridge 380. South bridge 380 may be coupled to various devices, including a non-volatile memory 385.

Additionally, the north bridge 320 may be coupled to an input/output (I/O) bridge 391 through an I/O bus 345. The I/O bridge 391 is in turn coupled to several peripheral devices, such as a network interface card (NIC) 396, and a SAS (Serial Attached Small Computer System Interface) controller 405 (FIG. 1B).

This SAS controller 405 is part of a SAS I/O subsystem (identified by numeral 400 in FIG. 1B). The SAS I/O subsystem 400 has an architecture that conforms with the SAS Standard, with one version described in Working Draft American National Standard, "Information Technology-Serial Attached SCSI (SAS)," Revision 5, dated Jul. 9, 2003. The SAS Standard defines the rules to enable the exchange of information between SCSI (small computer system interface) devices over a serial interconnect. SCSI devices include storage devices such as hard disk drives, compact disc (CD) drives, digital versatile disc (DVD) drives, and other mass storage devices. In other embodiments, SCSI devices can also include other types of peripheral devices.

Read or write operations to storage devices in the SAS I/O subsystem 400 may be generated by the CPU 310. In response to such read or write requests, the SAS controller 405 initiates read or write operations to the storage devices in one or more of first storage tree 420, second storage tree 460, third storage tree 470, and fourth storage tree 480 using SAS physical interconnections and messaging defined by the SAS Standard. In other arrangements, additional SAS controller(s) can also be present in the system.

In one embodiment, the SAS controller 405 is implemented as an application-specific integrated circuit (ASIC) that includes firmware. In other embodiments, the SCSI controller 405 can be implemented with other types of devices, such as processors, microcontrollers, and so forth. The SAS controller 405 is coupled to an expander 410 through links 406a–406d, according to one example. An expander is an input/output control device such as a switch that receives information packets at a port from a source and routes the information packets to the correct destination through another port.

Each end of a link 406 couples to a physical device referred to as a "phy" (PHYsical device) within the SAS controller 405 and the expander 410. In the example of FIG. 1B, four links 406a, 406b, 406c, and 406d are shown. A phy according to SAS typically includes a transceiver to electrically interface to the link 406 to communicate with a transceiver in another phy. According to SAS, each link is full duplex, such that information can be transferred simultaneously in both directions over the link. Each link 406 is a receive differential pair and a transmit differential pair. More generally, instead of using the term "phy," the term "interface" may be used to indicate a communications component of a device used for communicating over a link with another device. The ensuing discussion uses the term "phy" broadly to include any type of interface. A phy does not necessarily have to include a transceiver, but rather can include any other type of communication interface.

In the example arrangements shown, the expander 410 is coupled over links to devices in multiple storage trees 420, 460, 470, and 480. The links between the expander 410 and the storage tree 420 are labeled 416a and 416b.

The storage tree 420 includes three additional expanders 425, 430, and 435. The expander 425 is connected to the expander 410, storage devices (SD) SDA, SDB, SDC, SDX, SDY, and SDZ, expander 430, and expander 435. At the lowest level of the storage tree 420, expander 430 and expander 435 are each further connected to multiple storage devices. Each of expanders 410, 425, 430 and 435 includes a routing controller (described in greater detail below) that allows information received by one port to be transmitted to an expander or storage device through another port in the expander.

The current version of the SAS Standard does not allow two SAS domains (expander trees) to be cross-connected by a direct link, since such cross-connections may expose multiple paths to the same addresses and, if more than one cross-connection exists, loops may be created. To enhance flexibility according to some embodiments of the invention, links (referred to as "intercontroller links") can be provided between expanders in different SAS domains so that two or more initiators can communicate through the expanders rather than through dedicated phys in the initiators. For example, as shown in FIG. 1B, an ICL (intercontroller link) is provided between the expander 410 and another expander in a different SAS domain. This is described further below in connection with FIGS. 3A–3C.

To enable an intercontroller link between expanders, each expander connected to the intercontroller link marks one or more phys as reserved for intercontroller link use and hides such phys from normal SAS discovery (the SMP REPORT GENERAL and DISCOVER functions). For example, a 12-phy expander with one phy marked would report having 11 phys (instead of 12 phys) in response to a query for the number of phys present in the expander. However, the marked phy is able to complete a link reset sequence to enable the phy to be ready for use and still participate in routing. Other features to enable establishment of intercontroller links between expanders in different SAS domains are discussed below.

Figure 2A:
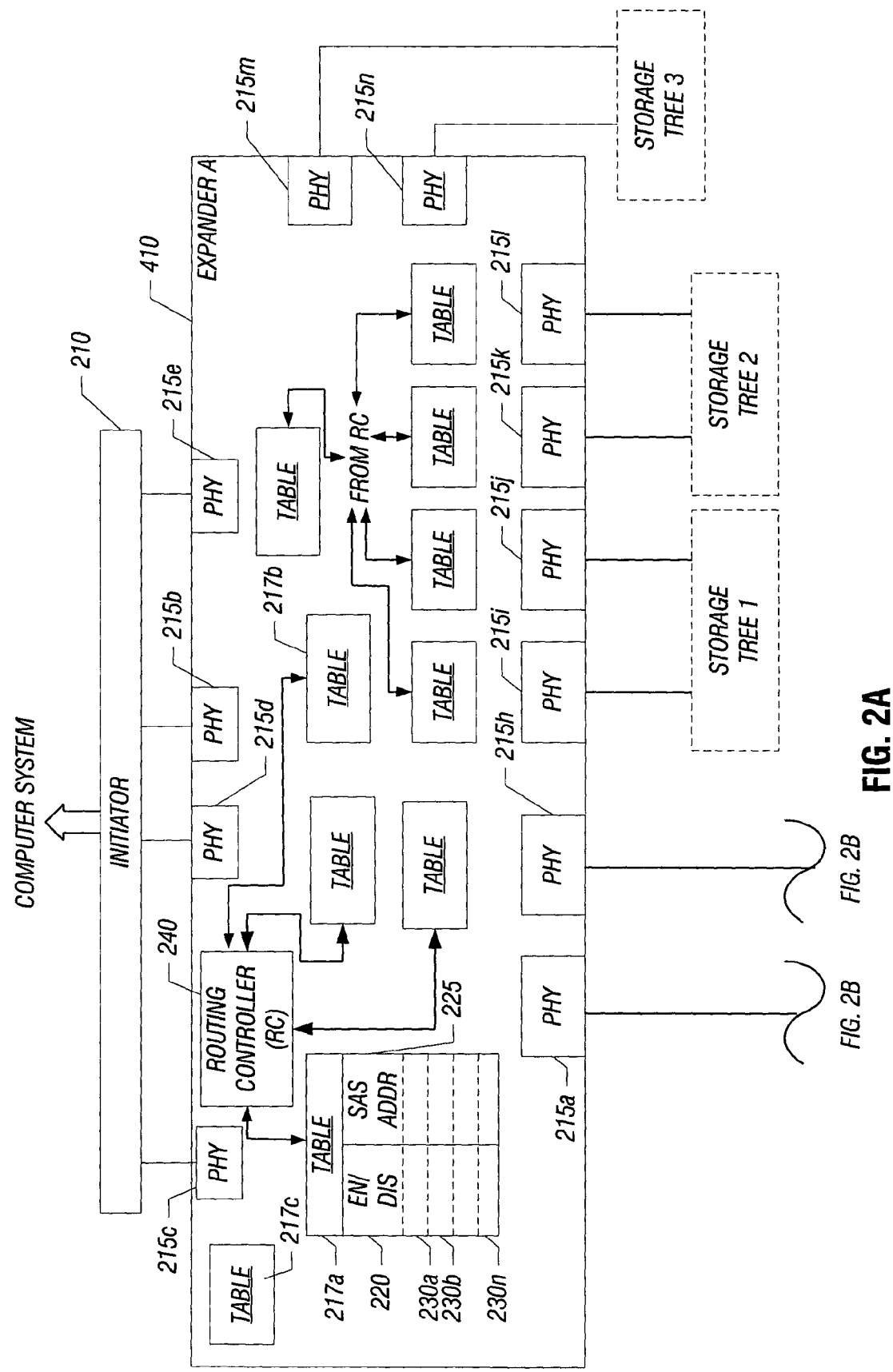
Figure 2B:
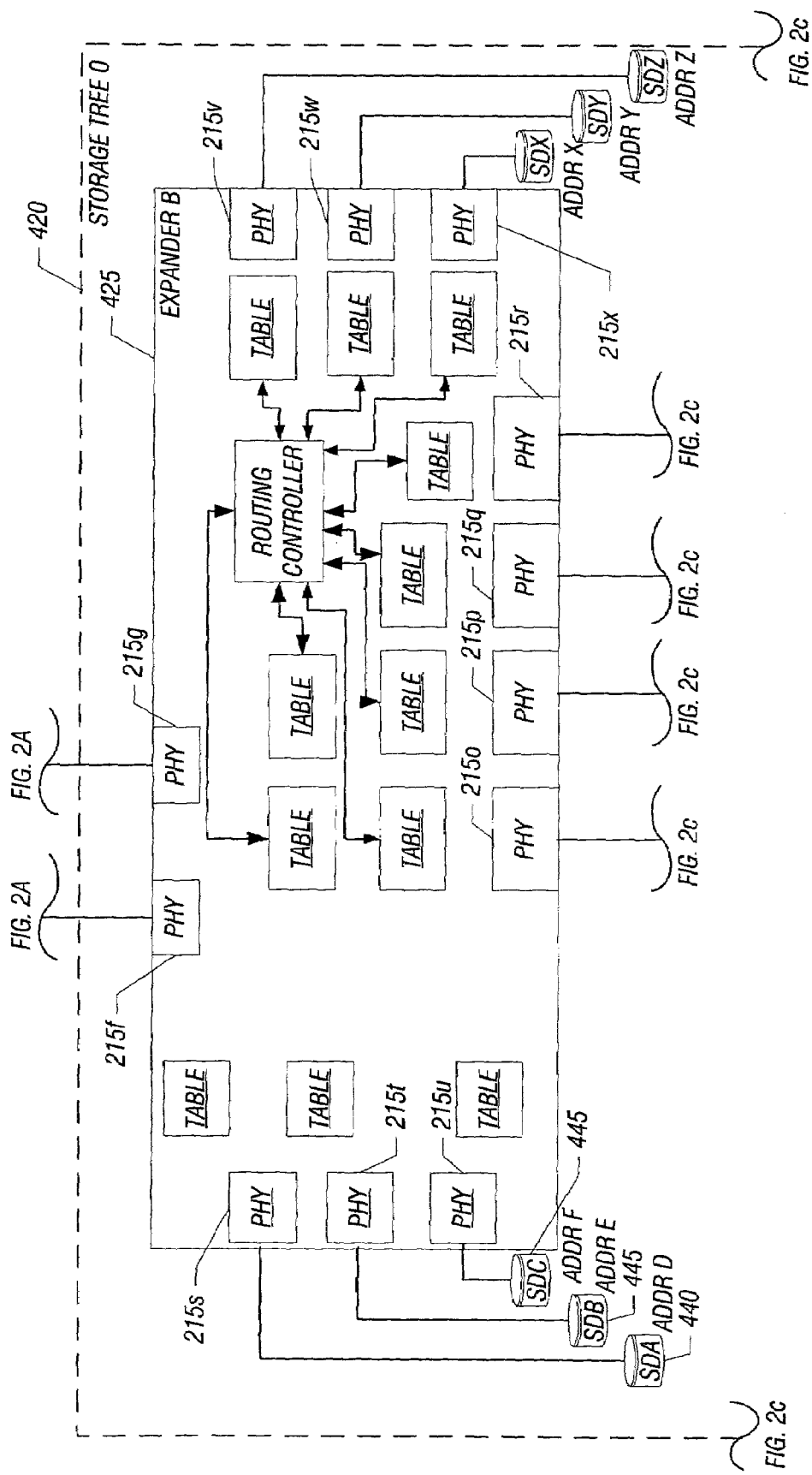

Turning now to FIGS. 2A–2C, the components of each expander shown in FIG. 1B are described in further detail. The SAS controller 405 is an initiator that generates read/write requests to the storage devices in the storage trees. The initiator may receive these requests from software executing on the CPU 310 (FIG. 1A) of computer system 107. In some embodiments of the invention, multiple initiators may be connected to expander 410.

The expander 410 includes storage to store routing tables 217a, 217b, 217c, and so forth, for respective phys 215a, 215b, 215c, and so forth. A routing table 217a for a phy 215a includes expander route entries 230a, 230b, ..., 230n, each of which may include an enable/disable bit 220 and a SAS address 225. A SAS address is a unique identifier assigned to an initiator, expander, or storage device. The routing table for each phy may include up to 12 route entries, according to one example implementation. A routing controller 240 in the expander 410 is able to access each routing table 217 to allocate and remap the route entries in each of the routing tables as desired.

Enable/disable bit 220 in a route entry indicates whether the route entry contains a valid SAS address. In some configurations, not all route entries in a routing table may be utilized. The enable/disable bit 220 for an un-utilized route entry is set to the disable state. Software executing in the computer system 107 in cooperation with route table entry mapping (RTEM) logic issue SAS SMP commands to the SMP target in the routing controller 240 to dynamically populate the routing tables in the expander 410 during a computer system power-on sequence. If the configuration of SAS I/O subsystem 400 is modified (e.g. replacement of failed components, addition of new components, etc.) while the system is operating, the computer software (by issuing SAS SMP commands) and routing control update the routing tables that are affected by the change.

Each phy in an expander has a routing attribute based on the external link connections to the expander coupled through the phy. A phy with a direct routing attribute has a link to a storage device or a host (a storage device or host is referred to as an "end device"). The routing table for a phy with the direct routing attribute does not contain any valid route table entries and thus the enable/disable bit 220 is disabled for each route entry. Examples of phys in FIG. 2B that have the direct routing attribute are 215s, 215t, 215u, 215v, 215w, and 215x in expander 425.

A phy with a subtractive routing attribute generally functions as an input phy in the expander (subtractive phys are upstream of table phys). Examples of phys that have the subtractive routing attribute are 215b, 215c, 215d, and 215e in expander 410 (FIG. 2A) and phys 215f and 215g in expander 425 (FIG. 2B). The routing table for a phy with the subtractive routing attribute does not contain any valid route table entries and thus the enable/disable bit 220 is disabled for each route entry.

A phy with a table routing attribute generally functions as an interface to another expander. Examples of phys that have the table routing attribute are 215a, 215h, 215i, 215j, 215k, 215l, 215m, and 215n in expander 410 (FIG. 2A) and phys 215o, 215p, 215q, and 215r in expander 425 (FIG. 2B). The routing table for a phy with the table routing attribute may include valid route table entries used by the routing controller to route read/write requests and perform information transfers.

A routing table is accessed by a routing controller for phys associated with the table routing attribute during transfer of information and routing of read/write requests. However, the routing controller does not access a routing table for phys with the direct routing attribute or subtractive routing attribute to route requests or transfer information. In some implementations, phys with the table routing attribute may employ the unused routing tables allocated to phys having the direct routing attribute or subtractive routing attribute. Thus, for expander 410, the unused routing table entries for subtractive routing attribute phys 215b, 215c, 215d, and 215e may be allocated to table routing attribute phys 215a, 215h, 215i, 215j, 215k, 215l, 215m, and 215n. Similarly, for expander 425, the unused routing table entries for direct attribute routing phys 215s, 215t, 215u, 215v, 215w, and 215x and subtractive routing attribute phys 215f and 215g may be allocated to table routing attribute phys 215o, 215p, 215q, and 215r. Finally, if a phy is not attached to a device through a link, the routing table associated with the phy remains unused and in some embodiments of the invention may allocate the unused routing table to other table routing attribute phys.

As mentioned previously, the routing table entries of a phy having the table routing attribute are initially populated during computer system power-on by software executing on the computer system in cooperation with RTEM logic in each routing controller. Alternatively, the expander may self-configure under control of the RTEM logic. In one example, the routing table for expander 410 phy 215a is shown below.

TABLE 1

Routing Table for Expander Phy 215a

| Enable/<br>Disable<br>Bit | SAS<br>Address |
|---|---|
| Enable | SD A |
| Enable | SD B |
| Enable | SD C |
| Enable | Expander 430 |
| Enable | Expander 435 |
| Enable | SD X |
| Enable | SD Y |
| Enable | SD Z |
| Enable | SD D |
| Enable | SD E |
| . . . | . . . |
| Enable | SD L |
| Enable | SD M |
| Enable | SD N |
| Enable | SD O |
| . . . | . . . |
| Enable | SD V |
| Enable | SD W |

Figure 3A:
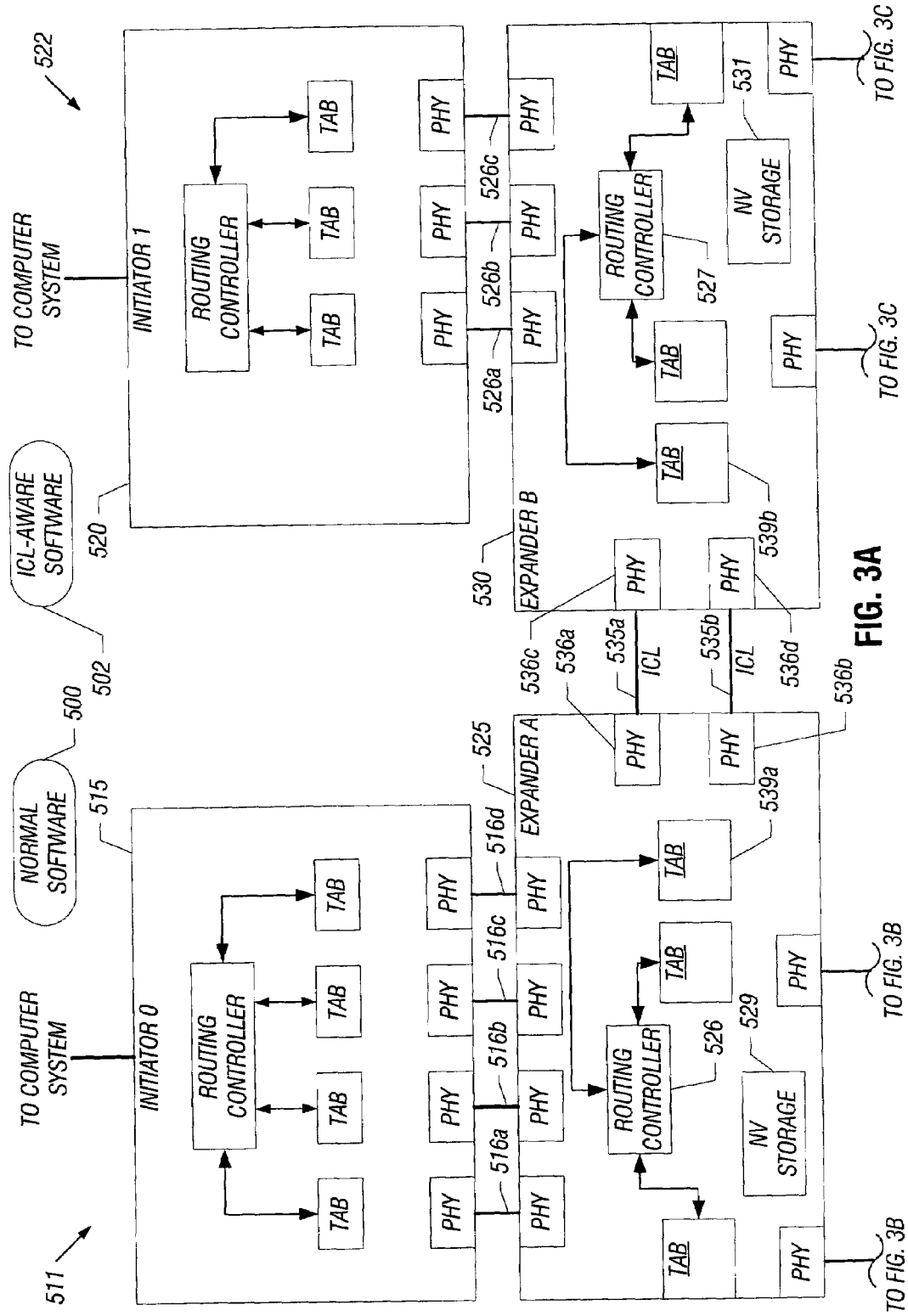
FIGS. 3A–3C are a block diagram of a system having plural SAS expander domains with an intercontroller link (ICL) coupling at least two expanders of two SAS expander domains.
Figure 3B:
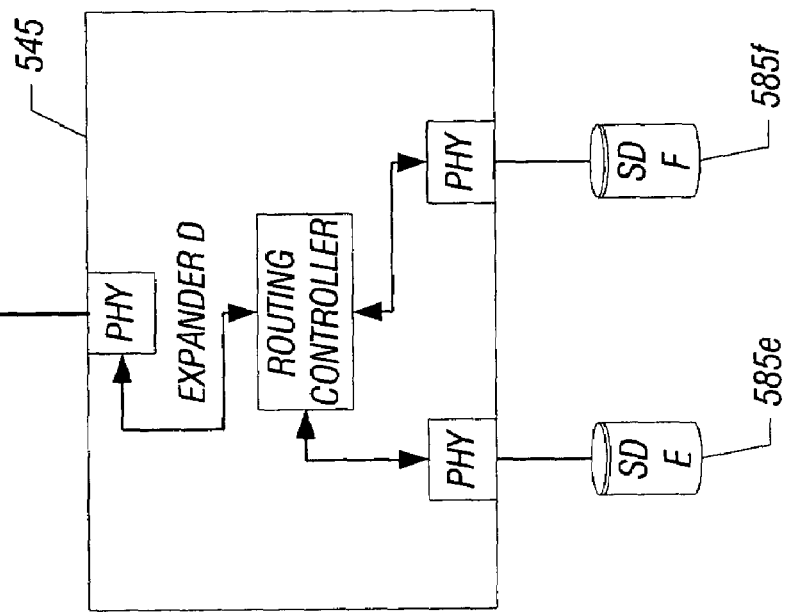
Figure 3B:
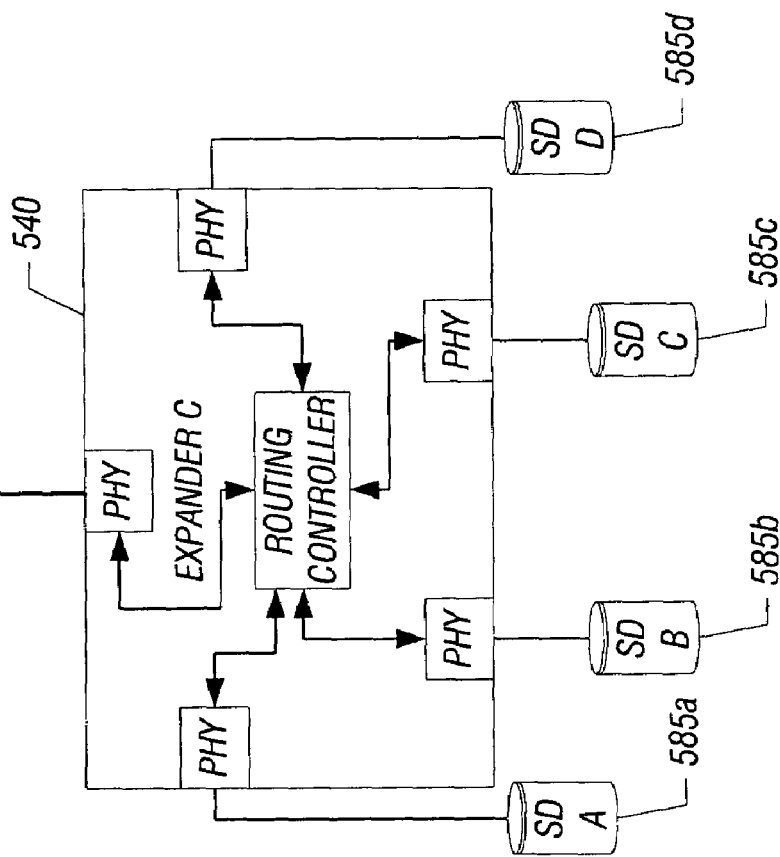
Figure 3C:
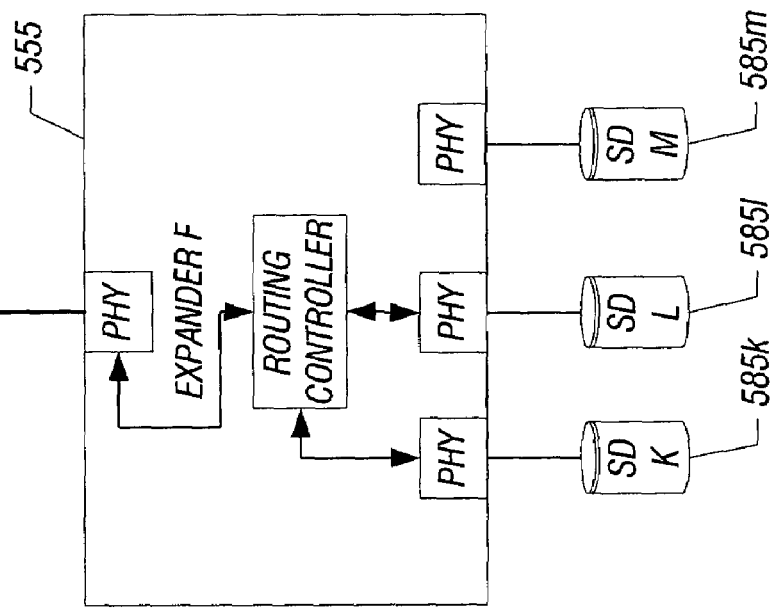
Figure 3C:
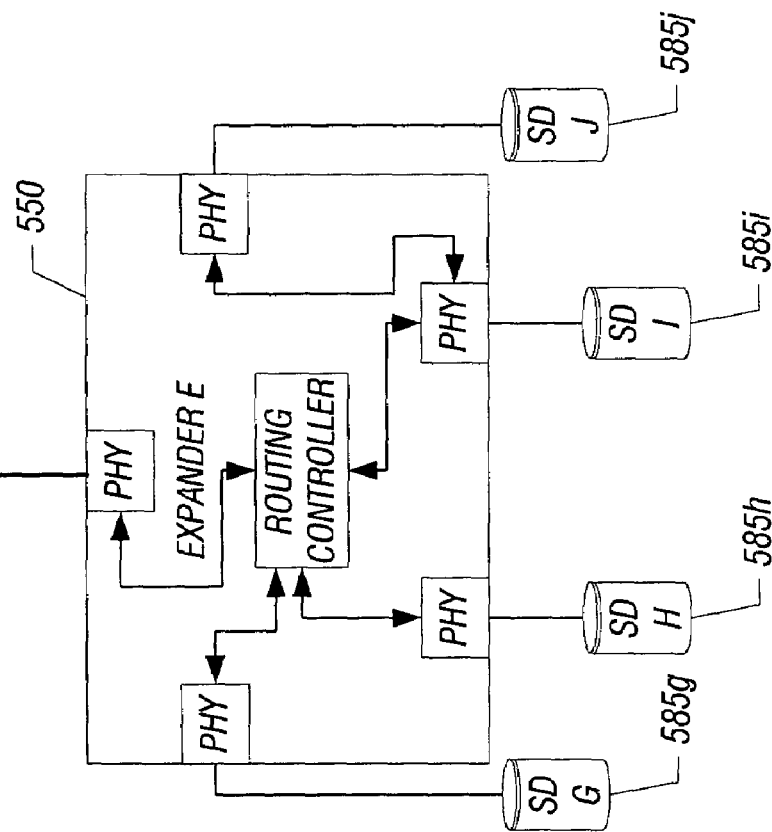

Referring to FIGS. 3A–3C, two SAS expander domains 511 and 522 are coupled through ICLs 535a and 535b to allow communication between initiators 515 and 520 in the respective SAS expander domains 511 and 522. The two expander domains 511 and 522 may be part of two different computer systems, or they may be part of one computer system. In another embodiment, additional SAS expander domains can be coupled by other ICLs. An initiator 515 may include a number of initiator phys (e.g., 4 phys), and the other initiator 520 may also include a number of initiator phys (e.g., 3 phys). The initiator 515 is coupled through links 516a, 516b, 516c, and 516d to expander 525 that includes a routing controller 526 as well as a number of phys with routing attributes as described above. Phy 536a and phy 536b (referred to as ICL phys) in expander 525 are connected to ICLs 535a and 535b, respectively. In the expander 530, ICL phys 536c and 536d are connected to the ICLs 535a and 535b. Expander 530 in SAS expander domain 522 is coupled to the initiator 520 through links 526a, 526b, and 526c. The expander 530 includes a routing controller 527 and a number of phys.

Expander 525 is coupled to other expanders, such as expander 540 and expander 545 (FIG. 3B) that are at a lower level in the SAS expander domain 511. Expanders 540 and 545 are coupled through links to a number of storage devices SDA 585a, SDB 585b, . . . , and SDF 585f, as shown in FIG. 3B. Similarly, the expander 530 is coupled to other expanders, such as expander 550 and expander 555 (FIG. 3C) at a lower level in the SAS expander domain 522. The expanders 550 and 555 are each coupled to a number of storage devices, such as SDG 585g, SDH 585h, . . . , and SDM 585m.

ICLs 535a and 535b allow initiator 515 and initiator 520 to communicate and exchange information without having to transmit requests over an external network, such as a computer bus, a local area network, and so forth. Also, initiator phys (located in initiators 515 and 520) do not have to be dedicated to such inter-initiator communications. In one example, the initiators 515 and 520 are SAS controllers that include caches. The initiators of the SAS expander domains are in communication to maintain cache coherency between caches associated with the initiators 515 and 520. The ICLs may also carry requests for information stored in the storage devices from one SAS expander domain to another SAS expander domain. Connecting the ICLs to expanders 525 and 530 rather than the initiators enable phys in the initiators 515 and 520 to connect to additional expanders for supporting more storage devices.

As noted above, the phys 536a, 536b, 536c, and 536d connected to the ICLs 535a and 535b are referred to as ICL phys. The routing tables associated with ICL phys (539a in expander 525 and 539b in expander 530) may contain different routing information than a routing table for a normal phy that is coupled to an expander in the same SAS domain.

In some implementations, the routing controller 526 at system power-on marks ICL phys 536a and 536b in the expander 525 as reserved for ICL use, which causes the ICL phys to be hidden from "normal" software 500 (FIG. 3A) executing on the computer system that assists the routing controller in creating the routing table entries. Thus, for example, an expander with 12 phys with two phys marked as reserved for ICL use by the routing controller as shown in FIG. 3A reports to the software 500 that 10 phys are available.

In some embodiments of the invention, an ICL phy may have the table routing attribute. In one example, an ICL phy such as phy 536a, 536b, 536c, or 536d, that is assigned a table routing attribute may have table entries that are populated by the routing controller as shown below in Table 2 (for routing table 539a associated with ICL phys 536a and 536b) and Table 3 (for routing table 539b associated with ICL phys 536c and 536d).

TABLE 2

Routing Table 539a for ICL Phys 536a and 536b

| Enable/<br>Disable<br>Bit | SAS<br>Address |
|---|---|
| Enable | Expander B |
| Enable | Initiator 1 |

TABLE 3

Routing Table 539b for ICL Phys 536c and 536d

| Enable/<br>Disable<br>Bit | SAS<br>Address |
|---|---|
| Enable | Expander A |
| Enable | Initiator 0 |

Each expander 525 and 530 is associated with storage, such as respective non-volatile storage 529 and 531 (e.g., read-only memory (ROM), flash memory, etc.), to store information to indicate the presence of ICL phys. Although shown as being located in the expanders 525 and 530, the non-volatile storage 529 and 531 can be part of an external storage (external to the expander domains). For example, a predefined range of addresses in the computer system 107 can be allocated to store ICL phy information for the various expander domains present in a system. In one example implementation, the ICL phy information is provided in one or more pages in vendor-specific address ranges according to the System Management Protocol (SMP).

The information contained in the allocated SMP page(s) include the following: a predefined string (e.g., "HPICL") so that the SMP page(s) can be readily found. For example, different expander manufacturers can store SMP pages at different locations within the predefined address range. The SMP page(s) also include phy numbers that identify ICL phys.

The SMP page(s) that store ICL phy information are accessed by special ICL-aware software 502 (FIG. 3A). The ICL-aware software 502 (which can alternatively be implemented as firmware executable on a microcontroller or other control device) cooperates with a routing controller in an expander with ICL phys to determine from the ICL page(s) whether ICL phys are present in an expander. If ICL phys are present, the ICL-aware software 502 populates routing tables for the ICL phys.

As shown above in Tables 2 and 3, the routing tables for ICL phys are filled with SAS addresses of expanders and initiator devices that communicate over the corresponding ICL. However, the routing tables for ICL phys should not contain SAS addresses of storage devices while being used as an ICL.

In some embodiments of the invention, ICL phys may not have the same capabilities of standard phys as described in the SAS Standard. Thus, for example, if the routing controller in an expander receives a broadcast message (e.g., a BROADCAST primitive defined by the SAS Standard) for broadcast to all devices in a SAS expander domain, the routing controller does not broadcast the message to ICL phys.

ICL phys can be identified by one of a number of different techniques. According to one technique, the computer system relies upon the normal software 500 honoring the NUMBER OF PHYS field returned in response to a query requesting the number of phys in an expander. In this case, if NUMBER OF PHYS returned is 11 (out of a possible of 12), then phys 0 through 10 are normal phys and phy 11 is an ICL phy.

In some other embodiments, an expander may include at least one ICL phy beyond the 11 phys visible to the software 500. The ICL phys may be numbered from 255 (FFh, which is the hexadecimal representation of 255) and counting down such that ICL phys have the higher numbers (FFh and lower), while the non-ICL phys have the lower numbers (starting at zero).

In the embodiment of FIGS. 3A–3C, the ICLs 535a and 535b are connected between expanders at the highest level of hierarchy in the expander domains. In other embodiments, an ICL is connected between expanders at lower levels of the expander domain hierarchy. In yet another embodiment, multiple ICLs are connected at multiple levels of expander domains.

The system discussed above includes various software or firmware routines or modules. The software routines or modules are executable on corresponding control modules, such as microprocessors, microcontrollers, or other control or computing devices. As used here, a "controller" refers to a hardware component, software component, or a combination of the two. A "controller" can also refer to plural hardware components, software components, or a combination of hardware components and software components.

Instructions of the software or firmware routines or modules are stored in one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; or optical media such as CDs or DVDs. Instructions that make up the various software routines or modules in the various systems are stored in respective storage modules. The instructions when executed by a respective control module cause the system to perform programmed acts.

While the present invention has been described with respect to a limited number of embodiments, those skilled in the art will appreciate numerous modifications and variations there from. It is intended that the appended claims cover all such modifications and variations as fall within the true spirit and scope of this present invention.

What is claimed is:

1. A system, comprising:
    plural storage subsystems, each storage subsystem having a controller, an expander, and zero or more storage devices coupled to the expander, the controller to access storage devices through the expander, and the expander having interfaces for coupling to storage devices; and
    an intercontroller link to connect expanders in different storage subsystems to enable the controller in one of the storage subsystems to communicate with the controller in another one of the storage subsystems through the expanders and the intercontroller link,
    wherein each storage subsystem includes serial attached small computer system interface (SAS) phys,
    wherein at least one of the expanders includes a SAS phy connected to the intercontroller link, wherein the at least one of the expanders includes a route table for the SAS phy, the route table containing a plurality of entries for routing information in the storage subsystem.

2. The system of claim 1, wherein each of the expanders includes a route table for the SAS phy connected to the intercontroller link, and the route table is programmed differently than route tables for SAS phys not connected to the intercontroller link.

3. A system, comprising:
    plural storage subsystems, each storage subsystem having a controller, an expander, and zero or more storage devices coupled to the expander, the controller to access storage devices through the expander, and the expander having interfaces for coupling to storage devices;
    an intercontroller link to connect expanders in different storage subsystems to enable the controller in one of the storage subsystems to communicate with the controller in another one of the storage subsystems through the expanders and the intercontroller link,
    wherein each storage subsystem includes serial attached small computer system interface (SAS) phys,
    wherein each of the expanders includes one or more SAS phys connected to the intercontroller link and one or more SAS phys connected to other components of the storage subsystem; and
    SAS discovery software to access the storage subsystems, wherein the one or more SAS phys connected to other components of the storage subsystem are visible to the SAS discovery software but the one or more SAS phys connected to the intercontroller link are not visible to the SAS discovery software.

4. A system, comprising:
    plural storage subsystems, each storage subsystem having a controller, an expander, and zero or more storage devices coupled to the expander, the controller to access storage devices through the expander, and the expander having interfaces for coupling to storage devices; and
    an intercontroller link to connect expanders in different storage subsystems to enable the controller in one of the storage subsystems to communicate with the controller in another one of the storage subsystems through the expanders and the intercontroller link, wherein each of the two storage subsystems has expanders at plural levels, the intercontroller link coupling expanders in the two storage subsystems.

5. The system of claim 4, wherein the intercontroller link couples expanders in the two storage subsystems at a first level, the system further comprising another intercontroller link to couple expanders in the two storage subsystems at a second level.

6. A system, comprising:
plural storage subsystems, each storage subsystem having a controller, an expander, and zero or more storage devices coupled to the expander, the controller to access storage devices through the expander, and the expander having interfaces for coupling to storage devices; and
an intercontroller link to connect expanders in different storage subsystems to enable the controller in one of the storage subsystems to communicate with the controller in another one of the storage subsystems through the expanders and the intercontroller link,
wherein each of the two storage subsystems has expanders at plural levels, wherein each of the expanders is coupled to zero or more storage devices.

7. The system of claim 6, wherein the controller, expanders, and zero or more storage devices in each storage subsystem are coupled by a serial interconnect.

8. The system of claim 6, wherein each storage subsystem includes serial attached small computer system interface (SAS) phys.

9. The system of claim 6, further comprising:
plural computers comprising respective plural storage subsystems.

10. The system of claim 6, wherein at least some of the expanders are coupled to one or more storage devices.

11. The system of claim 10, wherein the controller in each of the two storage subsystems is adapted to access the storage devices through one or more expanders.

12. A method for use in a system having plural storage subsystems, each storage subsystem having a controller and an expander, the method comprising:
accessing, by the controller in a first one of the storage subsystems, a storage device in the first storage subsystem through the expander in the first storage subsystem;
communicating over an intercontroller link that connects the expander in the first storage subsystem with an expander in a second one of the storage subsystems, wherein the controller in the first storage subsystem communicates with the controller in the second storage subsystem through the intercontroller link and the expanders in the first and second storage subsystems,
wherein each of the expanders in the first and second storage subsystems includes a SAS phy connected to the intercontroller link;
providing a routing table for the SAS phy in each of the first and second storage subsystems; and
populating a plurality of entries in the routing table with routing information.

13. The method of claim 12, further comprising accessing, by the controller in the second storage subsystem, a storage device in the second storage subsystem through the expander in the second storage subsystem.

14. The method of claim 12, further comprising the controllers in the first and second storage subsystems communicating with each other over the intercontroller link to maintain cache coherency.

15. A method for use in a system having plural storage subsystems, each storage subsystem having a controller and an expander, the method comprising:
accessing, by the controller in a first one of the storage subsystems, a storage device in the first storage subsystem through the expander in the first storage subsystem; and
communicating over an intercontroller link that connects the expander in the first storage subsystem with an expander in a second one of the storage subsystems, wherein the controller in the first storage subsystem communicates with the controller in the second storage subsystem through the intercontroller link and the expanders in the first and second storage subsystems,
wherein each of the expanders in the first and second storage subsystems includes one or more SAS phys connected to the intercontroller link and one or more SAS phys connected to other components of the storage subsystem;
enabling the one or more SAS phys connected to other components of the storage subsystems to be visible to normal SAS discovery software; and
maintaining the one or more SAS phys connected to the intercontroller link not visible to the SAS discovery software.

16. An expander in a first storage subsystem, comprising:
a first interface to couple to a storage device;
a second interface to couple to an intercontroller link to connect the expander in the first storage subsystem with an expander in a second storage subsystem;
a controller to communicate with another controller in the second storage subsystem through the second interface and the intercontroller link,
wherein each of the first and second interfaces comprises one or more SAS phys; and
a storage to store a route table associated with each SAS phy to couple to the intercontroller link, the route table containing routing information associated with the second storage subsystem.

17. The expander of claim 16, further comprising an additional SAS phy to couple to another expander in the first storage subsystem, the storage further to store a route table associated with the additional SAS phy, wherein the route table for the SAS phy to couple to the intercontroller link is programmed differently than the route table for the additional SAS phy.

18. A system comprising:
plural storage subsystems, each storage subsystem having a means for controlling access to storage devices, and a plurality of expanding means at plural levels for coupling to the storage devices; and
means for interconnecting the expanding means in different storage subsystems to enable the controlling means in one of the storage subsystems to communicate with the controlling means in another one of the storage subsystems through the expanding means and the interconnecting means.

19. The system of claim 18, wherein each of the expanding means has a SAS phy to connect to the interconnecting means.

* * * * *